United States Patent [19]

Fujiwara et al.

[11] 4,032,513

[45] June 28, 1977

[54] PROCESS OF PRODUCING ALKENYLPHENOL POLYMERS

[75] Inventors: Hiroshi Fujiwara; Asao Takahashi; Motomu Miyamoto, all of Soka, Japan

[73] Assignee: Maruzen Oil Co. Ltd., Osaka, Japan

[22] Filed: Mar. 30, 1976

[21] Appl. No.: 671,927

[52] U.S. Cl. .................... 260/47 UA; 260/32.4; 526/141; 526/217
[51] Int. Cl.² ................ C08G 33/10; C07C 39/18; C08K 5/16
[58] Field of Search .............. 260/47 UA, 32.4; 526/217, 141, 342

[56] References Cited

UNITED STATES PATENTS 3,422,062   1/1969   Segal et al. .................. 260/32.4

*Primary Examiner*—Joseph L. Schofer
*Assistant Examiner*—Herbert J. Lilling
*Attorney, Agent, or Firm*—Sughrue, Rothwell, Mion, Zinn & Macpeak

[57] ABSTRACT

A process of producing a high molecular weight alkenylphenol polymer which comprises cationically polymerizing an alkenylphenol, such as vinylphenol, in the presence of a nitrile using a cationic polymerization initiator in a homogeneous reaction system. The resulting alkenylphenol polymer is useful as a starting material for preparing a thermosetting resin, a high molecular weight electrolytic substance, an ion exchange membrane, adhesives, glass-fiber-reinforced composite materials, etc.

10 Claims, No Drawings

PROCESS OF PRODUCING ALKENYLPHENOL POLYMERS

BACKGROUND OF THE INVENTION

1. Field of the Invention

This invention relates to a process of producing an alkenylphenol polymer, and, more particularly, to a process of producing a high molecular weight alkenylphenol polymer at high yield by performing the cationic polymerization of an alkenylphenol in a homogeneous reaction system.

2. Description of the Prior Art

Various studies have hitherto been reported on the production of an alkenylphenol polymer by the radical polymerization of an alkenylphenol, such as p-vinylphenol. However, the products in accordance with conventional methods have a low molecular weight. Therefore, in order to synthesize a high molecular weight polymer, complicated and uneconomical steps were inevitably required. That is, a phenolic hydroxyl group in the molecule of the starting material must first be acetylated (e.g., by converting p-vinylphenol to p-acetoxystyrene) and then subjected to radical polymerization, followed by hydrolyzing the resulting high molecular weight polymer.

Recently, it was reported in *Journal of Polymer Science A*-1, Vol. 7, p 2405–2410, 1960, that each of the o-, m- and p-isomers of vinylphenol can be subjected to cationic polymerization in the presence of a halogenated hydrocarbon solvent, such as methylene chloride, ethyl chloride, etc., using a cationic polymerization initiator in a non-homogeneous reaction system to obtain the corresponding polymer of high molecular weight. This method was considered as an industrially epoch-making synthesis in the art since a high molecular weight vinylphenol polymer could be synthesized directly from vinylphenol in only one step.

However, this method has several serious defects. One is that the solubility of the alkenylphenol in halogenated hydrocarbons is low, particularly, the solubility remarkably drops at lower temperatures. As is well known in the art, in cationic polymerization the lower the reaction temperature the higher the molecular weight of the resulting polymer. Thus, it is preferred that the alkenylphenol be polymerized at a monomer concentration (i.e., concentration of alkenylphenol in the halogenated hydrocarbon) as high as possible and at a temperature as low as possible. However, in the case that a halogenated hydrocarbon solvent is used, the above demands cannot be satisfied due to limitations on the solubility of the alkenylphenol in the halogenated hydrocarbon solvent. Further, it is not advantageous to use a large quantity of halogenated hydrocarbon solvent, and, also, cost increases are inevitable with increased size of the reaction apparatus used. Another defect of this method is that the stability of the alkenylphenol in the halogenated hydrocarbon solvent is not satisfactory. As a result, a substantial amount of polymer is formed at room temperature even in the absence of the polymerization initiator, which results in introducing a loss of the starting material monomer. Still further, this method provides a polymerization reaction of poor reproducibility so that a low molecular weight polymer is often unexpectedly formed though a high molecular weight polymer having a molecular weight of about 200,000 can be produced at low temperature ($-20°$ C) even under the same reaction conditions.

SUMMARY OF THE INVENTION

As a result of various investigations to produce a high molecular weight alkenylphenol polymer in a stable fashion and without being accompanied by the aforesaid faults, the inventors have discovered that a very high molecular weight alkenylphenol polymer can be prepared at high yield and with good reaction reproducibility at a comparatively high temperature as compared to conventional processes by performing the polymerization reaction in the presence of a nitrile using a cationic polymerization initiator.

One object of the present invention is to provide a process of producing a high molecular weight alkenylphenol polymer at high yield.

Another object of the present invention is to provide a process of producing a high molecular weight alkenylphenol polymer from an alkenylphenol with good reaction reproducibility.

Still another object of the present invention is to provide a process of producing a high molecular weight alkenylphenol polymer by performing the cationic polymerization in a homogeneous reaction system.

Other objects and advantages of the present invention will be made clear by the following more detailed explanation.

DESCRIPTION OF THE PREFERRED EMBODIMENTS

A main object of the present invention is to provide an improved process of producing a high molecular weight polymer in a stable fashion, which comprises cationically polymerizing an alkenylphenol in the presence of a nitrile using a cationic polymerization initiator.

According to the process of this invention, a high molecular weight alkenylphenol polymer is obtained at almost quantitative high yields and with good polymerization reaction reproducibility at a considerably high temperature as compared with a conventional cationic polymerization. Furthermore, it is a substantial benefit of this invention that since the solubility of an alkenylphenol monomer in a nitrile is very high, the polymerization can be practiced with a monomer concentration of greater than about 15 to about 20%, as compared with the conventional method, in a homogeneous reaction system.

By the process of this invention, a high molecular weight alkenylphenol polymer having a weight mean molecular weight (hereafter merely "molecular weight") of from about 200,000 to about 300,000 can be synthesized at a reaction temperature of about $20°$ C, which is exceptionally high for a conventional cationic polymerization, and, further, when the reaction temperature is reduced from about $-20°$ C to about $-30°$ C, a linear alkenylphenol polymer having a higher molecular weight of from about 900,000 to about 1,000,000, which is soluble in a solvent, can be obtained. Examples of solvents used in the present invention include alcohols such as methanol, ethanol, propanol, etc., ketones such as acetone, methyl ethyl ketone, methyl isobutyl ketone, etc., ether compounds such as tetrahydrofuran, dioxane, etc., esters such as methyl acetate, ethyl acetate, butyl acetate, etc., acids such as acetic acid, etc., and phenols such as phenol, cresol, etc.

By "alkenylphenol" is meant a monohydric phenol possessing a straight chain alkenyl group having at least 2 carbon atoms or a branched chain alkenyl group having at least 3 carbon atoms. Preferred examples of the akenylphenol used in this invention are monohydric phenols each possessing an alkenyl group having 2 to 4 carbon atoms, such as vinylphenol, n-propenylphenol, isopropenylphenol, n-butenylphenol, sec-butenylphenol, tert-butenylphenol, etc. A particularly preferred alkenylphenol is a monohydric phenol possessing an alkenyl group having 2 to 3 carbon atoms.

Furthermore, the alkenylphenol may be a p-, m-, or o-isomer or, further, a mixture thereof, but is preferably a p- and/or m-isomer. The most preferred alkenylphenol is a p-alkenylphenol such as p-vinylphenol, p-(n-propenyl)phenol, p-(isopropenyl)phenol, etc.

Examples of nitriles used in the process of the present invention are saturated aliphatic mononitriles and aromatic nitriles having a boiling point below about 200° C at 760 mmHg. Of these nitriles, aliphatic nitriles having 2 to 7 carbon atoms (e.g., acetonitrile, propionitrile, butyronitrile, valeronitrile, capronitrile, enanthonitrile, etc.) and benzonitrile are preferred. It has hitherto been reported in, for example, Overberger, *J.A.C.S.*, 85, 446 (1963) and P. H. Pleach, *The Chemistry of Cationic Polymerization*, 647 (1963), that these nitriles act as a polymerization inhibitor in the cationic polymerization of an unsaturated hydrocarbon. Therefore, it was surprising that in the present invention a high molecular weight alkenylphenol polymer can be obtained in the presence of a nitrile. These nitriles are good solvents for the alkenylphenol monomer and the polymer thereof; in particular, the nitrile according to the present invention is an excellent solvent for the alkenylphenol polymer formed. It has been estimated from various experimental results that the nitrile used in the present invention forms a complex with the polymerization initiator (catalyst) and thus has a preferred affect of stabilizing catalytic activity. From this viewpoint, the nitrile of the present invention is substantially different from the solvent used in a conventional cationic polymerization. The alkenylphenol monomer is a fairly unstable compound and tends to easily polymerize at around room temperature. But, when the alkenylphenol monomer is present with the nitrile in the system, the alkenylphenol monomer is quite stable even at around room temperature.

As the cationic polymerization initiator, any Lewis acid- or Bronsted acid-type (or electron acceptor-type) initiator which is used in a conventional cationic polymerization can be used in the present invention. Examples of cationic polymerization initiators useful in the present invention are metal halides such as boron trifluoride or a complex salt thereof, aluminum chloride, tin tetrachloride, vanadium oxychloride, etc., and organometallic compounds such as diethylaluminum monochloride, etc., or, further, combinations of these compounds. The amount of the polymerization initiator is generally from about 0.01 to about 5 mol%, preferably from 0.1 to 1.0 mol%, to the alkenylphenol monomer used.

The reaction temperature in accordance with the present invention is generally from about +50° to about −100° C, preferably from +30 ° to −50° C.

The reaction can be carried out at any pressure, i.e., atmospheric pressure, elevated pressure or reduced pressure, preferably at atmospheric pressure. The reaction time is, in general, from about 1 minute to about 10 hours, preferably 2 minutes to 3 hours.

Further, the concentration of the alkenylphenol monomer in the nitrile solution is generally from about 1 to about 50% by weight, preferably from 5 to 20% by weight, based on the nitrile.

At the practice of the process of this invention, the object of the present invention can be attained by stirring appropriate amounts of, as a starting material, an alkenylphenol monomer, nitrile and polymerization initiator at an appropriately selected reaction temperature. For convenience's sake, the alkenylphenol monomer and polymerization initiator are individually dissolved in the nitrile prior to the reaction, and each of the resulting nitrile solutions is then provided for the reaction. Further, in practicing the process of the present invention, it is preferred to sufficiently remove water in the reaction system. In general, the nitrile solution of the alkenylphenol monomer, and the like are contacted with an appropriate drying agent for drying, such as aluminosilicate, (a molecular sieve having an effective pore size below about 10 A), alumina, silica gel, anhydrous sodium sulfate, calcium chloride, etc., for a predetermined period prior to the reaction, and dehydrated and dried. The reaction is preferably carried out under an atmosphere of, for example, dry air, nitrogen gas, etc.

At the initiation of the cationic polymerization reaction, it is preferred that the water content of the reaction mixture in the reaction system generally be lower than about 1,000 p.p.m., preferably lower than 200 p.p.m.

In practicing the polymerization reaction, since the polymerization reaction rate of the alkenylphenol is very high, it is preferred that the occurrence of abrupt increases in the reaction temperature be avoided by controlling the concentration and addition amount of the polymerization initiator and/or by equipping the system with a condenser, if necessary.

The molecular weight of the alkenylphenol polymer can be optionally varied by changing the reaction temperature, the concentration of the monomer solution, etc. For example, the lower the reaction temperature, the higher the molecular weight of the resulting polymer. Further, the higher the concentration of the monomer solution, the higher the molecular weight of the resulting polymer. When the concentration of the monomer solution is increased to too high a level, the molecular weight of the resulting polymer does not increase so much tends to come close to the upper limit of a definite molecular weight. Generally, the weight mean molecular weight of the thus obtained polymer is from about 5,000 to about 1,000,000, preferably 10,000 to 950,000.

After the end of the cationic polymerization reaction, the polymer formed can be separated from the reaction mixture by pouring the reaction mixture into water, benzene or the like, or by distilling off the nitrile from the reaction mixture at atmospheric pressure or reduced pressure, preferably at reduced pressure such that the nitrile can be distilled off at temperatures below about 100° C. The isolated polymer is generally a substantially colorless powdery polymer although the state may slightly differ depending upon the molecular weight thereof. The thus obtained alkenylphenol polymer is useful as a starting material for a production of a thermosetting resin, high molecular weight electrolytic substance (e.g., condensation-precipitating agent, electric conductive treating agent, etc.), ion exchange membrane, adhesive, glass-fiber-reinforced composite material, etc. For instance, a thermosetting resin can generally be prepared by mixing the polymer obtained in the present invention with an isocyanate, an epoxy resin or the like. Further, an electrolytic substance or ion exchange membrane can be prepared by introducing a functional group such as a sulfonic acid group, a quaternary ammonium base group or the like into the polymer obtained in the present invention or a filmy material thereof. Still further, the polymer obtained in the present invention can per se be used as an adhesive.

The invention will now be illustrated by several examples which are not, however, to be construed as limiting the invention thereto. In all Examples, the reactions were carried out at atmospheric pressure.

EXAMPLE 1

A four necked flask equipped with a stirrer, a dropping funnel, and a thermometer was sufficiently dried for two hours and then the introduction of dry air into the flask followed by vacuum suction was applied three times to provide a reaction flask.

On the other hand, 20 g of a p-vinylphenol monomer recrystallized from hot n-hexane was dissolved in 200 ml of acetonitrile and the solution obtained was placed in a dry flask together with 40 ml of synthetic aluminosilicate for drying followed by sealing the flask. The flask was then allowed to stand overnight at room temperature and thereafter the supernatant formed was transferred to another dry vessel. The molecular sieve left after separating the supernatant was washed with anhydrous acetonitrile and the washings were combined with the aforesaid supernatant to provide 305 ml of a solution. After sampling 5 ml of the solution and quickly measuring the water content (51.5 ppm), 300 ml of the remaining solution was immediately poured in the above prepared reaction flask.

The reaction flask containing the solution was then immersed in a dry ice-methanol bath to cool the reaction system to $-9°$ C, and an acetonitrile solution of a boron trifluorideethyl ether complex salt having a concentration of 0.12 mole/liter was gradually added dropwise to the reaction system from the dropping funnel with stirring over about 5 minutes while controlling the reaction conditions so that abrupt increases of the reaction temperature did not occur. The reaction system was then further stirred for 5 minutes to complete the reaction.

In the reaction, the amount of the polymerization initiator added was 0.28 mole percent per mole of the p-vinylphenol monomer and the maximum reaction temperature was $-3°$ C. Furthermore, the total water content of the reaction system was 51.5 ppm. The total amount of acetonitrile used in this Example was about 280 ml.

After the reaction was over, the reaction mixture formed was gradually added to 1 liter of water to precipitate the polymer obtained, which was recovered by filtration and subjected to vacuum drying at 50° C to provide 19.2 g of fibrous polymer. On the other hand, the amount of the mixture of the p-vinylphenol monomer and the polymer thereof recovered by extracting the molecular sieve used for drying with methanol was 0.8 g; thus, it was confirmed that the monomer used in the reaction polymerized quantitatively.

The polymer obtained could be completely dissolved in a polar organic solvent such as methanol, acetone, tetrahydrofuran, etc.

The intrinsic visocity ($\eta$) of the polymer measured in tetrahydrofuran at 30° C was 1.21. Also, the weight mean molecular weight ($\overline{M}_w$) and the number means molecular weight ($\overline{M}_n$) of the polymer measured by gel permeation chromatography in comparison with those of standard polystyrene were 530,000 and 116,000, respectively, and $\overline{M}_w/\overline{M}_n$ was 4.19.

EXAMPLE 2

The same procedure as in Example 1 was followed except that the polymerization reaction was carried out at a reaction temperature of from $-27°$ C to $-23°$ C. The polymer was obtained in quantitative yield, the intrinsic viscosity of the polymer measured in tetrahydrofuran at 30° C was 1.56, the $\overline{M}_w$ and $\overline{M}_n$ of the polymer measured by gel permeation chromatography were 709,000 and 150,000, respectively, and $\overline{M}_w/\overline{M}_n$ was 4.72. The polymer could be completely dissolved in various organic solvents.

EXAMPLE 3

The same procedure as in Example 1 was followed except that the polymerization reaction was carried out at a reaction temperature of from 27° C to 29° C, and silica gel was used as a drying agent in place of synthetic aluminosilicate. The polymer was obtained in quantitative yield, the intrinsic viscosity of the polymer measured in tetrahydrofuran at 30° C was 0.62, the $\overline{M}_w$ and $\overline{M}_n$ of the polymer measured by gel permeation chromatography were 209,000 and 740,000, respectively, and $\overline{M}_w/\overline{M}_n$ as 2.82. The polymer could also be completely dissolved in various organic solvents.

EXAMPLE 4

The same procedure as in Example 1 was followed except that the amount of the p-vinylphenol monomer employed was 50 g. The polymer was obtained in quantitative yield, the intrinsic viscosity of the polymer measured in tetrahydrofuran at 30° C was 2.03, the $\overline{M}_w$ and $\overline{M}_n$ of the polymer measured by a gel permeation chromatography were 896,000 and 311,000, respectively, $\overline{M}_w/\overline{M}_n$ was 2.88. The polymer could almost completely be dissolved in various organic solvents but an immeasurable slight amount of insoluble matter formed in each case.

EXAMPLE 5

The same procedure as in Example 1 was followed except that boron trifluoride gas (in an amount of 0.4 mole% per mole of the monomer) was used as the polymerization initiator. The polymer was obtained in quantitative yield and the intrinsic viscosity cf the polymer measured in tetrahydrofuran at 30° C was 1.01.

EXAMPLE 6

The same procedure as in Example 1 was followed except that vanadium oxytrichloride (in an amount of 1.0 mole% per mole of the monomer) was used as the polymerization initiator. The polymer was obtained in quantitative yield and the intrinsic viscosity of the polymer measured in tetrahydrofuran at 30° C was 0.98.

EXAMPLE 7

The same procedure as in Example 1 was followed except that propionitrile as used as the polymerization solvent. The polymer was obtained in quantitative yield and the intrinsic viscosity of the polymer measured in tetrahydrofuran at 30° C was 1.20.

EXAMPLE 8

The same procedure as in Example 1 was followed except that p-isopropenylphenol was used as the monomer in place of p-vinylphenol. The polymer was obtained in quantitative yield, and was completely dissolved in ethanol, acetone and tetrahydrofuran. The intrinsic viscosity ($\eta$) of the polymer measured in tetrahydrofuran at 30° C was 0.22.

EXAMPLE 9

The same procedure as in Example 1 was followed except that m-isopropenylphenol was used as the monomer in place of p-vinylphenol. The polymer was obtained in quantitative yield, and was completely dissolved in ethanol, acetone and tetrahydrofuran. The intrinsic viscosity ($\eta$) of the polymer measured in tetrahydrofuran at 30° C was 0.15.

EXAMPLE 10

The same procedure as in Example 1 was followed except that m-vinylphenol was used as the monomer in place of p-vinylphenol. The polymer was obtained in a yield of about 70% and was completely dissolved in methanol, acetone and tetrahydrofuran. The intrinsic viscosity ($\eta$) of the polymer measured in tetrahydrofuran at 30° C was 0.30.

COMPARISON EXAMPLE 1

The same procedure as in Example 1 was followed except that methylene chloride was used as the solvent in place of acetonitrile. After completion of the reaction, the precipitated polymer was filtered and then dissolved in methanol. The resulting solution was poured into water and subjected to precipitation. The polymer was obtained in almost quantitative yield, and was completely dissolved in methanol, acetone and tetrahydrofuran.

The intrinsic viscosity ($\eta$) of the polymer measured in tetrahydrofuran at 30° C was 0.50. Also, the weight mean molecular weight ($\overline{M}_w$) and the number mean molecular weight ($\overline{M}_n$) of the polymer measured by gel permeation chromatography in comparison with those of standard polystyrene were 176,000 and 39,100, respectively, and $\overline{M}_w/\overline{M}_n$ was 4.50.

As is apparent from the foregoing result, in the case that the nitrile was not added to the reaction system the molecular weight of the resulting polymer was very low.

COMPARISON EXAMPLE 2

The same procedure as in Comparison Example 1 was followed except that m-vinylphenol was used as the monomer in place of p-vinylphenol. The polymer was obtained in a yield of about 50%, and was completely dissolved in methanol, acetone and tetrahydrofuran. The intrinsic viscosity ($\eta$) of the polymer measured in tetrahydrofuran at 30° C was 0.10.

As is apparent from the foregoing result, in the case that the nitrile was not added to the reaction system, the yield of the polymer also decreased.

While the invention has been described in detail and with reference to specific embodiments thereof, it will be apparent to one skilled in the art that various changes and modifications can be made therein without departing from the spirit and scope thereof.

What is claimed is:

1. A process of producing an alkenylphenol polymer which comprises cationically polymerizing an alkenylphenol in the presence of a nitrile using a cationic polymerization initiator, wherein said nitrile is a saturated aliphatic mononitrile or an aromatic nitrile having a boiling point below about 200° C at 760 mm Hg and the concentration of the alkenylphenol monomer in said nitrile solution is from about 1 to about 50% based on the weight of said nitrile.

2. The process of claim 1, wherein said cationic polymerization initiator is at least one selected from the group consisting of boron trifluoride, a complex salt of boron trifluoride, aluminum chloride, tin tetrachloride, vanadium oxychloride and diethylaluminum monochloride.

3. The process of claim 1, wherein said cationic polymerization is used in an amount of from about 0.01 to about 5 mole% to said alkenylphenol monomer.

4. The process of claim 1, wherein the polymerization reaction is carried out at a temperature of from about +50° C to about −100° C.

5. The process of claim 1, wherein said alkenylphenol monomer and said cationic polymerization initiator are used as a nitrile solution.

6. The process of claim 1, wherein the water content in the reaction mixture is lower than about 1,000 ppm.

7. The process of claim 1, wherein the nitrile solution of said alkenylphenol is contacted with a drying agent and dehydrated before the polymerization reaction.

8. The process of claim 1, wherein the resulting reaction product is poured into water or benzene to thereby isolate the polymer and recover it.

9. The process of claim 1, wherein the resulting reaction product is distilled to remove said nitrile, whereby the polymer is isolated and recovered.

10. The process of claim 1, wherein said nitrile is present as a solvent for the alkenylphenol monomer and the alkenylphenol polymer.

* * * * *